UNITED STATES PATENT OFFICE.

PHILIBERT CHEVALIER, OF LYONS, FRANCE.

IMPROVEMENT IN THE MANUFACTURE OF COLORING-MATTERS FROM ANILINE.

Specification forming part of Letters Patent No. 53,241, dated March 13, 1866.

*To all whom it may concern:*

Be it known that I, PHILIBERT CHEVALIER, of Lyons, in the Empire of France, have invented certain new and useful Improvements in the Manufacture of certain Coloring-Matters from Aniline; for dyeing and printing silk, wool, cotton, and other textile, vegetable, or animal substances; and I hereby declare that the following is a full, clear, and exact description of the same.

My invention consists in the production, by the means and in the manner hereinafter described, from aniline or homologous substances of two new coloring-matters—red and violet.

In order to obtain these two coloring-matters I take commercial aniline (a mixture of pure aniline and its isomeric substances) and transform it into a salt, preferably an arseniate. To this salt I add a quantity of a nitrite, especially the nitrite of potash, about equal in weight to the aniline used. I heat this mixture to the temperature at which the aniline is raised to the boiling-point. This degree of temperature should in no case be exceeded. The operation is accomplished when the product in the presence of an acid turns blue.

The matter thus produced is composed of two coloring substances—the one red, the other violet—incorporated in the products of super-oxidation. The mixture, when at the boiling-point, is treated with an alkalinized water, which dissolves the red matter and leaves the violet matter insoluble. I precipitate the red matter which is held in solution by a neutral salt, such as sulphate of soda, chloride of sodium, &c. This red matter produces the shades or tints of saffron in fabrics with greater permanency of color than is caused by the saffron.

To disengage the violet matter from the useless substances which accompany it, I treat the whole mass which is derived from the alkaline treatment with an acidulated water. The violet coloring-matter is dissolved in the presence of the acid. I filter and precipitate the violet matter held in solution by neutralization. In this state this coloring-matter produces on material to which it is applied shades or tints similar to those of archil.

The two coloring-matters which I have just described—the one red, the other violet—are soluble in water. The essential characteristics by which they are distinguished from the colors of rosaniline (known in trade as "fuchiacine" and "violet") are, first, the manner in which they are affected by the presence of alkalies. They do not form a white base, as is the case with the salts of rosaniline; and a textile fabric dyed with these matters resists without discoloration the action of the alkalies, whereas fabrics dyed with fuchiacine are discolored by alkalies; second, the manner in which they are affected by the presence of acids, under the influence of which they become blue, while under the same influence the salts of rosaniline (fuchiacine) become yellow. It follows, therefore, that these new coloring-matters do not resemble in their physical and chemical characteristics the coloring-matters which have already been produced from aniline, and that their constitution and structure differ essentially from those of the latter.

Having thus described my invention, I would state my claim as follows:

1. As new products, the coloring-matters herein described, derived from aniline and its homologues.

2. The process of producing the said coloring-matters, substantially as herein described and set forth.

In testimony whereof I have signed my name to this specification before two subscribing witnesses.

PHILIBERT CHEVALIER.

Witnesses:
LOUIS WM. VIOLLIER,
JULIEN HOUSTON.